US010166704B2

(12) United States Patent
Preisler et al.

(10) Patent No.: US 10,166,704 B2
(45) Date of Patent: *Jan. 1, 2019

(54) METHOD OF MAKING A LAMINATED TRIM COMPONENT AT A PAIR OF SPACED FIRST AND SECOND MOLDING STATIONS

(71) Applicant: Global IP Holdings, LLC, Sterling Heights, MI (US)

(72) Inventors: Darius J Preisler, Macomb, MI (US); Christopher A. Heikkila, Washington Township, MI (US); Steven A. Mitchell, Linden, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 796 days.

This patent is subject to a terminal disclaimer.

(21) Appl. No.: 14/803,442

(22) Filed: Jul. 20, 2015

(65) Prior Publication Data

US 2015/0321394 A1 Nov. 12, 2015

Related U.S. Application Data

(63) Continuation-in-part of application No. 13/762,956, filed on Feb. 8, 2013, now Pat. No. 9,770,849.

(51) Int. Cl.
*B29C 45/14* (2006.01)
*B29C 43/18* (2006.01)
(Continued)

(52) U.S. Cl.
CPC .............. *B29C 45/14* (2013.01); *B29C 43/18* (2013.01); *B29C 43/10* (2013.01);
(Continued)

(58) Field of Classification Search
CPC .......... B29C 45/14336; B29C 45/0055; B29C 45/14467; B29C 45/14475; B29C 45/14795; B29C 45/14811
See application file for complete search history.

(56) References Cited

U.S. PATENT DOCUMENTS 3,551,563 A 12/1970 Volkmann
3,568,254 A 3/1971 Stolki
(Continued)

FOREIGN PATENT DOCUMENTS

WO 2010080967 A1 7/2010

OTHER PUBLICATIONS

Notice of Allowance and Fee(s) Due; related U.S. Appl. No. 14/603,404; dated Dec. 2, 2016.
(Continued)

*Primary Examiner* — Matthew J Daniels
(74) *Attorney, Agent, or Firm* — Brooks Kushman P.C.

(57) ABSTRACT

A method of making a laminated trim component at a pair of spaced first and second molding stations is provided. A heated plastic composite sheet is pressed against a heated laminated sheet to bond a plastic cushioning layer of the laminated sheet to the composite sheet at the first molding station. The step of pressing compresses a portion of the laminated sheet spaced inwardly from an outer periphery of the laminated sheet to locally compact and thin the cushioning layer at the portion to form a compressed portion of the cushioning layer. The bonded sheets are transferred to the second molding station where a plastic compatible with the plastic of the composite sheet is molded around the composite sheet to form at least one component at the inner surface of the composite sheet.

24 Claims, 14 Drawing Sheets

(51) Int. Cl.
*B29L 31/30* (2006.01)
*B29C 43/10* (2006.01)
*B29C 43/56* (2006.01)

(52) U.S. Cl.
CPC .. *B29C 2043/182* (2013.01); *B29C 2043/563* (2013.01); *B29L 2031/3005* (2013.01); *B29L 2031/3014* (2013.01); *B29L 2031/3041* (2013.01); *Y10T 156/1044* (2015.01)

(56) References Cited

U.S. PATENT DOCUMENTS

| | | | |
|---|---|---|---|
| 3,750,525 | A | 8/1973 | Waters et al. |
| 3,955,266 | A | 5/1976 | Honami et al. |
| 4,175,995 | A | 11/1979 | Walter |
| 4,204,822 | A | 5/1980 | Hewitt |
| 4,550,854 | A | 11/1985 | Schellenberg |
| 4,692,108 | A | 9/1987 | Cesano |
| 4,717,612 | A | 1/1988 | Shackelford |
| 4,836,380 | A | 6/1989 | Walter et al. |
| 4,941,785 | A | 7/1990 | Witten |
| 5,143,778 | A * | 9/1992 | Shuert .............. B32B 27/32 428/213 |
| 5,198,175 | A | 3/1993 | Kato et al. |
| 5,217,563 | A | 6/1993 | Niebling et al. |
| 5,316,604 | A | 5/1994 | Fell |
| 5,324,384 | A | 6/1994 | Spengler |
| 5,352,397 | A | 10/1994 | Hara et al. |
| 5,370,521 | A | 12/1994 | McDougall |
| 5,417,179 | A | 5/1995 | Niemier et al. |
| 5,462,421 | A | 10/1995 | Stein et al. |
| 5,474,008 | A | 12/1995 | Vespoli et al. |
| 5,502,930 | A | 4/1996 | Burkette et al. |
| 5,506,029 | A * | 4/1996 | Hara ............... B29C 45/14786 428/120 |
| 5,614,285 | A * | 3/1997 | Gardill ............. B29C 70/345 428/156 |
| 5,700,050 | A | 12/1997 | Gonas |
| 5,718,791 | A | 2/1998 | Spengler |
| 5,746,870 | A | 5/1998 | Tomioka et al. |
| 5,827,595 | A * | 10/1998 | Jones ............... B29C 51/145 428/71 |
| 5,911,360 | A | 6/1999 | Schellenberg |
| 5,915,445 | A | 6/1999 | Rauenbusch |
| 5,928,735 | A | 7/1999 | Padmanabhan et al. |
| 6,050,630 | A | 4/2000 | Hochet |
| 6,102,464 | A | 8/2000 | Schneider et al. |
| 6,280,551 | B1 | 8/2001 | Hilligoss |
| 6,435,577 | B1 | 8/2002 | Renault |
| 6,537,413 | B1 | 3/2003 | Hochet et al. |
| 6,546,694 | B2 | 4/2003 | Clifford |
| 6,655,299 | B2 | 12/2003 | Preisler et al. |
| 6,682,675 | B1 | 1/2004 | Vandangeot et al. |
| 6,682,676 | B1 | 1/2004 | Renault et al. |
| 6,695,998 | B2 | 2/2004 | Sandefer et al. |
| 6,748,876 | B2 | 6/2004 | Preisler et al. |
| 6,790,026 | B2 | 9/2004 | Vandangeot et al. |
| 6,823,803 | B2 | 11/2004 | Preisler |
| 6,843,525 | B2 | 1/2005 | Preisler |
| 6,890,023 | B2 | 1/2005 | Preisler |
| 6,981,863 | B2 | 1/2006 | Renault et al. |
| 7,090,274 | B1 | 8/2006 | Khan et al. |
| 7,121,128 | B2 | 10/2006 | Kato et al. |
| 7,204,056 | B2 | 4/2007 | Sieverding |
| 7,393,036 | B2 | 7/2008 | Bastian et al. |
| 7,419,713 | B2 | 9/2008 | Wilkens et al. |
| 7,909,379 | B2 | 3/2011 | Winget et al. |
| 7,919,031 | B2 | 4/2011 | Winget et al. |
| 8,052,237 | B2 | 11/2011 | Althammer et al. |
| 8,062,762 | B2 | 11/2011 | Stalter |
| 8,117,972 | B2 | 2/2012 | Winget et al. |
| 8,262,968 | B2 | 9/2012 | Smith et al. |
| 8,622,456 | B2 | 1/2014 | Preisler et al. |
| 8,651,549 | B2 | 2/2014 | Raffel et al. |
| 8,690,233 | B2 | 4/2014 | Preisler et al. |
| 8,808,833 | B2 | 8/2014 | Preisler et al. |
| 8,833,829 | B2 | 9/2014 | Wenzel et al. |
| 8,834,985 | B2 | 9/2014 | Preisler et al. |
| 9,302,315 | B2 | 4/2016 | Verbeek et al. |
| 9,364,975 | B2 | 6/2016 | Preisler et al. |
| 2003/0194542 | A1 | 10/2003 | Springer |
| 2003/0197400 | A1 | 10/2003 | Preisler et al. |
| 2004/0150127 | A1 | 8/2004 | Sandefer et al. |
| 2005/0189674 | A1 | 9/2005 | Hochet et al. |
| 2006/0121244 | A1 | 6/2006 | Godwin et al. |
| 2006/0255611 | A1 | 11/2006 | Smith et al. |
| 2008/0169678 | A1 | 7/2008 | Ishida et al. |
| 2008/0185866 | A1 | 8/2008 | Tarrant et al. |
| 2008/0193256 | A1 | 8/2008 | Neri |
| 2010/0026031 | A1 | 2/2010 | Jouraku |
| 2010/0170746 | A1 | 7/2010 | Restuccia et al. |
| 2011/0281076 | A1 | 11/2011 | Anderson et al. |
| 2011/0315310 | A1 | 12/2011 | Trevisan et al. |
| 2012/0091698 | A1 | 4/2012 | Wolfe et al. |
| 2013/0052412 | A1 | 2/2013 | Fox et al. |
| 2013/0260112 | A1 | 10/2013 | Lee et al. |
| 2013/0273191 | A1 | 10/2013 | Dooley |
| 2013/0278002 | A1 | 10/2013 | Preisler et al. |
| 2013/0278003 | A1 | 10/2013 | Preisler et al. |
| 2013/0278009 | A1 | 10/2013 | Preisler et al. |
| 2013/0278015 | A1 | 10/2013 | Preisler et al. |
| 2013/0278018 | A1 | 10/2013 | Preisler et al. |
| 2013/0278019 | A1 | 10/2013 | Preisler et al. |
| 2013/0278020 | A1 | 10/2013 | Preisler et al. |
| 2013/0280469 | A1 | 10/2013 | Preisler et al. |
| 2013/0280472 | A1 | 10/2013 | Preisler et al. |
| 2013/0280473 | A1 | 10/2013 | Preisler et al. |
| 2013/0312652 | A1 | 11/2013 | Preisler et al. |
| 2013/0316123 | A1 | 11/2013 | Preisler et al. |
| 2013/0341971 | A1 | 12/2013 | Masini et al. |
| 2014/0077518 | A1 | 3/2014 | Preisler et al. |
| 2014/0077530 | A1 | 3/2014 | Preisler et al. |
| 2014/0077531 | A1 | 3/2014 | Preisler et al. |
| 2014/0145465 | A1 | 5/2014 | Preisler et al. |
| 2014/0145470 | A1 | 5/2014 | Preisler et al. |
| 2014/0147617 | A1 | 5/2014 | Preisler et al. |
| 2014/0147622 | A1 | 5/2014 | Preisler et al. |
| 2014/0225296 | A1 | 8/2014 | Preisler et al. |
| 2014/0342119 | A1 | 11/2014 | Kastell et al. |
| 2015/0027622 | A1 | 1/2015 | Kastell |
| 2015/0130105 | A1 | 5/2015 | Preisler et al. |
| 2015/0130220 | A1 | 5/2015 | Preisler et al. |
| 2015/0130221 | A1 | 5/2015 | Preisler et al. |
| 2015/0130222 | A1 | 5/2015 | Preisler et al. |
| 2015/0132532 | A1 | 5/2015 | Preisler et al. |
| 2016/0059446 | A1 | 3/2016 | Lofgren |

OTHER PUBLICATIONS

Final Office Action; related U.S. Appl. No. 14/603,430; dated Dec. 7, 2016.
Non-Final Office Action; related U.S. Appl. No. 15/337,013; dated Dec. 27, 2016.
Notice of Allowance and Fee(s) Due; related U.S. Appl. No. 14/603,418; dated Dec. 28, 2016.
Office Action; related U.S. Appl. No. 13/479,974; dated Mar. 20, 2014.
Office Action; related U.S. Appl. No. 13/686,362; dated Mar. 25, 2014.
Office Action; related U.S. Appl. No. 13/523,253; dated Mar. 25, 2014.
Office Action; related U.S. Appl. No. 13/688,972; dated Mar. 28, 2014.
Office Action; related U.S. Appl. No. 13/687,232; dated Mar. 28, 2014.
Office Action; related U.S. Appl. No. 13/689,809; dated Mar. 31, 2014.
Office Action; related U.S. Appl. No. 13/687,213; dated Mar. 31, 2014.
Office Action; related U.S. Appl. No. 13/690,265; dated Mar. 31, 2014.

(56) References Cited

OTHER PUBLICATIONS

Office Action; related U.S. Appl. No. 13/762,904; dated Apr. 8, 2014.
Office Action; related U.S. Appl. No. 13/762,800; dated Apr. 8, 2014.
Office Action; related U.S. Appl. No. 13/762,861; dated Apr. 9, 2014.
Office Action; related U.S. Appl. No. 13/690,566; dated Apr. 9, 2014.
Office Action; related U.S. Appl. No. 13/762,832; dated Apr. 11, 2014.
Office Action; related U.S. Appl. No. 13/762,921; dated Apr. 14, 2014.
Notice of Allowance; related U.S. Appl. No. 13/686,388; dated Apr. 15, 2014.
Office Action; related U.S. Appl. No. 13/453,201 (now U.S. Pat. No. 8,690,233); dated Nov. 20, 2013.
Office Action; related U.S. Appl. No. 13/523,209 (now U.S. Pat. No. 8,622,456) dated Apr. 29, 2013.
Office Action; related U.S. Appl. No. 13/479,974; dated Oct. 15, 2014.
Office Action; related U.S. Appl. No. 13/762,879; dated Feb. 13, 2015.
Office Action; related U.S. Appl. No. 13/479,974; dated Feb. 13, 2015.
Notice of Allowance; related U.S. Appl. No. 13/603,552; dated Feb. 18, 2015.
Notice of Allowance; related U.S. Appl. No. 14/087,591; dated Mar. 12, 2015.
Office Action; related U.S. Appl. No. 14/603,413; dated Apr. 23, 2015.
Notice of Allowance and Fee(s) Due; related U.S. Appl. No. 14/603,403; dated Jan. 29, 2016.
Office Action; related U.S. Appl. No. 14/087,563; dated Jul. 20, 2015.
Office Action; related U.S. Appl. No. 13/762,879; dated Jul. 31, 2015.
Notice of Allowance and Fee(s) Due; related U.S. Appl. No. 14/087,579; dated Aug. 3, 2015.
Corrected Notice of Allowability; related U.S. Appl. No. 14/603,401; dated Jun. 23, 2016.
Office Action; related U.S. Appl. No. 14/603,418; dated Jun. 16, 2016.
Notice of Allowance and Fee(s) Due; related U.S. Appl. No. 14/444,164; dated Jul. 15, 2016.
Office Action; related U.S. Appl. No. 14/603,397; dated Jul. 21, 2016.
Office Action; related U.S. Appl. No. 14/603,430; dated Sep. 14, 2016.
Office Action; related U.S. Appl. No. 14/603,404; dated Aug. 25, 2016.
Notice of Allowance and Fee(s) Due; related U.S. Appl. No. 14/087,563; dated Mar. 3, 2016.
Notice of Allowance and Fee(s) Due; related U.S. Appl. No. 14/603,397; dated Oct. 17, 2016.
Office Action; related U.S. Appl. No. 14/603,407; dated Oct. 4, 2016.

* cited by examiner

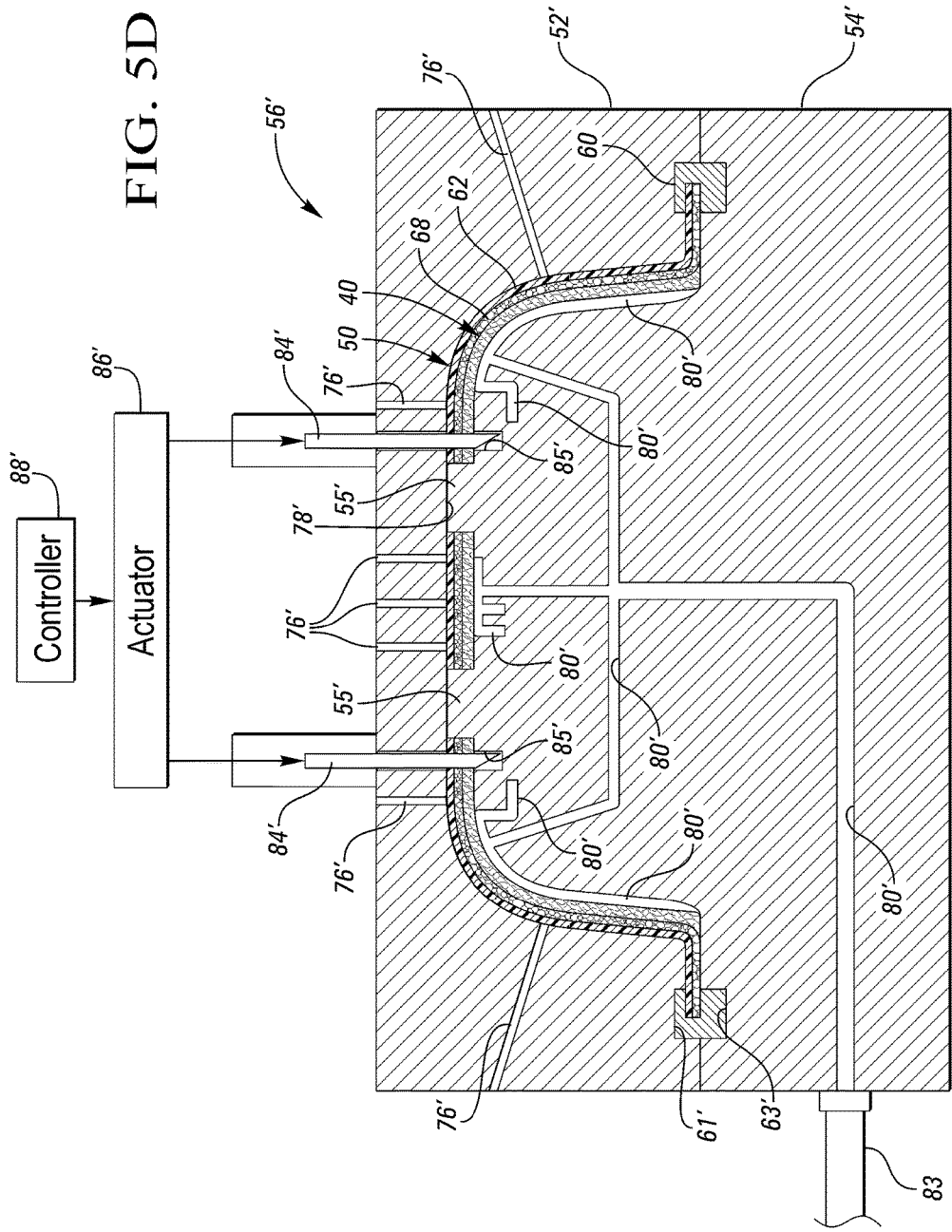

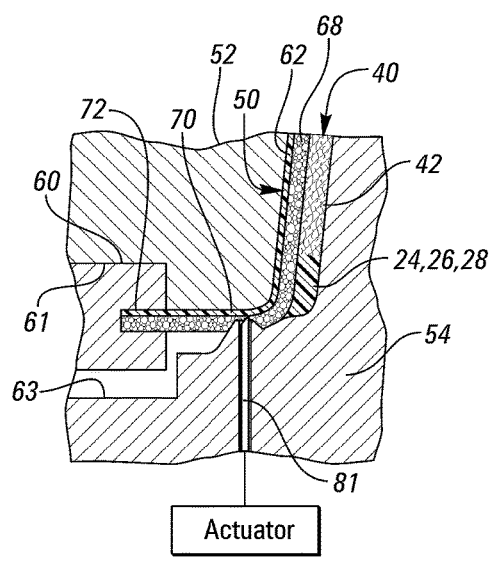
FIG. 6A
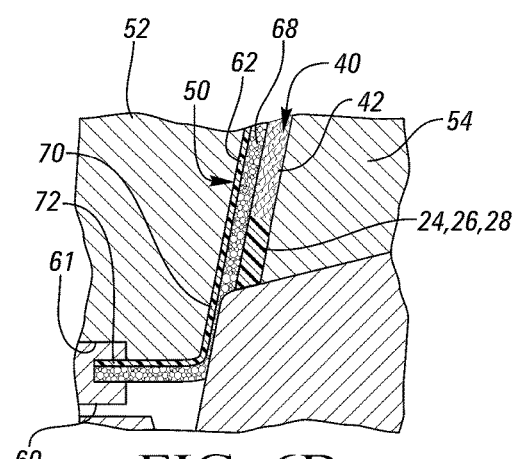
FIG. 6B
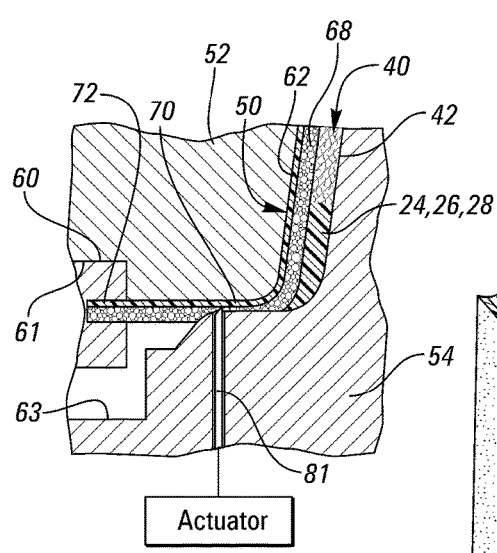
FIG. 6C
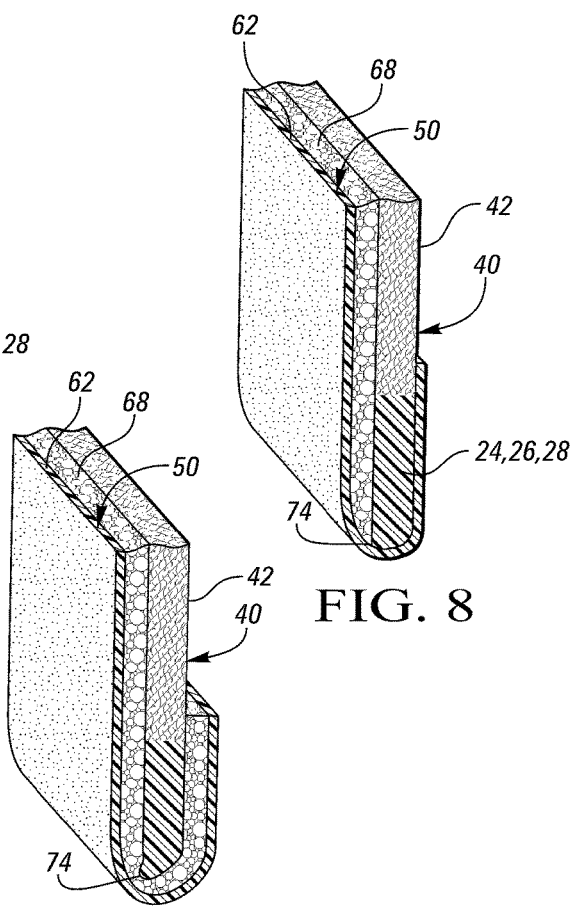
FIG. 7
FIG. 8

METHOD OF MAKING A LAMINATED TRIM COMPONENT AT A PAIR OF SPACED FIRST AND SECOND MOLDING STATIONS

CROSS-REFERENCE TO RELATED APPLICATIONS

This application is a continuation-in-part of U.S. application Ser. No. 13/762,956 filed Feb. 8, 2013.

TECHNICAL FIELD

This invention relates, in general, to methods of making laminated trim components and, in particular, to molding methods of making laminated trim components at different molding stations.

Overview

Compression molding has long been used to manufacture plastic parts or components. While widely used to manufacture thermoset plastic parts, compression molding is also used to manufacture thermoplastic parts. The raw materials for compression molding are typically placed in an open, heated, mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. Compression molding is thought to be largely limited to flat or moderately curved parts with no undercuts.

Vacuum during compression molding of thermoset parts has been used to minimize surface defects of the type known as porosity. Porosity is caused by air that is trapped between the molding compound (i.e. raw materials) and the surface of the mold cavity. The mold chamber or cavity is sealed from the surrounding atmosphere and then the chamber is evacuated before pressure is applied to the raw materials.

Many molded parts are used in the interior of vehicles. The substrate of the part is often made of plastic or preferably of a fibrous molding material.

Natural fiber composite panels utilized as a substrate have very important characteristics because of their light weight and high environmental sustainability.

As described in U.S. patent publication Nos. 2014/0342119 and 2015/0027622, the substrate of the molded part may be realized in a laminar fashion and has an essentially plane contour or a three-dimensional contour with convex and concave regions defined by the respective design, as well as, if applicable, one or more openings and recesses for trim strips and control elements such as pushbuttons, switches and rotary knobs for power windows and exterior rearview mirrors. In order to fix the molded parts in the passenger compartment or on the vehicle door and to mount handles, control elements and storage trays on the molded part, the molded part is also equipped with mounting parts that are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

As described in U.S. patent publication No. 2015/0027622, an interior covering part is produced which comprises a substrate or a carrier part component and a decorative film or a decorative layer. For producing the interior covering part, a substrate of fiber molding material, in particular a natural fiber molding material, and a decorative film or a decorative layer are formed in two steps, wherein these are pressed together in a first step of the two steps and in particular hot-pressed.

As starting material or semi-finished product for a substrate, which is used for producing the carrier component, a fiber molding material in the form of a plastic mat with fiber components and especially a polypropylene (PP)-bound fiber mat with natural fibers and/or plastic fibers, a polypropylene (PP)-bound fiber mat with ceramic, carbon or glass fibers is used especially. This (substrate) can be plasticisable in particular through the supply of heat. When using a polypropylene (PP)-bound fiber mat as substrate, this preferentially comprises a material component of a fiber material, which is preferentially formed of natural fibers or glass fibers as well as plastic or carbon fibers and in particular with polypropylene (PP)-fibers (binding function). Alternatively or additionally nature fiber PP (NFPP) or glass fiber PP can be used as fiber mat. As natural fibers, fibers of wood, kenaf, hemp, jute, flax, china grass, rattan, soya, ocra, banana, bamboo, coconut, coir, cotton, curaua, abaca, pine, pineapple, raffia palm and/or sisal can be used. Synthetic fibers can also be used. Chips of wood can also be used as starting material for the carrier material. As synthetic fibers, carbon fibers, fibers of polyester, acrylate, aramide, Twaron, Kevlar, Technora, vinylon, Cylon and/or polypropylene can be used. A combination of a plurality of types of the mentioned natural fibers or other fibers can also be used in the substrate. As part of the present invention, the term "polymers" comprises both homopolymers as well as copolymers of the mentioned polymer types U.S. patent publication No. 2013/0052412 discloses a vehicular trim component made by concurrent compression forming and injection molding.

The side of the respective molded part or substrate that faces the vehicle interior is usually referred to as the visible side. In order to provide the visible side with an attractive appearance, the substrate is equipped with one or more decorative elements of a textile material or a plastic film. The plastic films used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The respective mounting parts or retainers are made of plastic or a metallic material such as sheet steel and mechanically connected to the substrate by means of retaining elements such as pins, screws or clips or by means of interlacing, clawing or clamping. Retainers advantageously comprise claws and/or clips as integral components. The claws and clips are respectively provided for engaging into recesses of the substrate or for being bent around the edge of the substrate, as well as for being fixed by means of clamping, during the installation of the retainers.

Different methods that typically comprise two or more production steps are known for the manufacture of molded parts for the interior trim of vehicles.

According to one known method, a substrate is initially produced of a fibrous molding material by means of hot-pressing. Subsequently, retainers are attached to the installation side of the substrate, e.g., by means of friction welding or bonding. In a third step, one or more decorative elements are laminated onto the visible side of the substrate. In a simplified two-step variation of the method, retainers of a metallic material with integrated retaining elements, particularly with claws, are compressed together with the fibrous molding material, wherein the retaining elements penetrate into the fibrous molding material and non-positively anchor the retainers on the substrate after the fibrous molding material has cured.

According to another known method, a substrate is manufactured of a thermoplastic by means of injection molding, particularly by means of back-injection molding. One or more decorative elements are preferably arranged in a back-injection mold and back-injected with the thermally plasticized plastic. After the molten plastic has cooled and solidified, the decorative elements are non-positively bonded to the substrate. In another step, mounting parts or retainers are respectively mounted on the installation side of the substrate.

One example of a surface texture is disclosed in WO 2010/080967 A1, according to which an interior trim panel of fibrous molding material is equipped with a smooth, transparent, liquid-impermeable, scratch-resistant and UV-resistant coating of a material, preferably a thermoplastic polymer, with a melting point in the range of 60 to 170.degree. C. The coating is applied by means of hot-pressing, wherein the material of the coating partially sinks into the fibrous molding material such that the coating is non-positively connected to the fibrous molding material.

As described in U.S. Pat. No. 5,462,421 and U.S. patent publication No. 2004/0150127, current vehicle inner door panels comprise laminates of various types. In some inner door panels, a structural backing material is covered by an embossed covering, which is often vinyl. These panels are formed by bonding the covering to the backing in a mold which embosses the covering. Sometimes a filler material, such as cellulose or a foam sheet, is bonded between the backing and covering. After bonding, the periphery of these panels must be trimmed before vehicle installation. In the past, this trimming has been usually accomplished in a separate trim fixture.

The industry has developed a mold apparatus wherein the laminate is formed in a mold that also includes external trimming knives that provide a finished panel ready for vehicle installation. Such apparatus is shown in U.S. Pat. No. 4,692,108 to Cesano. All of the materials used in forming the Cesano type of laminated panel are preformed.

Another type of inner door panel in use is a laminate comprising a structural substrate of reinforced foam covered by a vinyl covering. This type of laminate is formed by placing the vinyl and reinforcing material in a mold and thereafter injecting foamable materials, which expand, set up and cure in the mold. After curing, this unfinished laminate requires further processing before it is ready for vehicle installation. It is removed from the mold and transferred to a trim fixture, where it is finally trimmed by accurately cutting the periphery with a water jet or the like.

Some problems attend this post-formation trimming operation. For example, the unfinished panel must be accurately positioned in the fixture. If it is not, the final panel will be out of dimension and unusable. Such a panel must be scrapped. Also, this post-formation trimming operation requires additional handling, equipment and labor.

In both U.S. patent publications U.S. Pat. No. 5,462,421 and 2004/0150127 trim blades are carried by a mold member. In 2004/0150127 a mechanism is provided to perform perimeter edge folding and perimeter trimming of a cladding layer in a single operation.

U.S. patent publications U.S. Pat. No. 8,833,829 and 2012/0091698 disclose polymer skin/foam bilaminate sheets. These all-olefin sheets are low cost, low weight, recyclable sheets which can be formed into vehicle interior components.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, door panels, instrument panels, steering wheels, head rests, upper seat portions, headliners, load floors and pillar coverings.

As described in U.S. patent publication 2014/0225296, one problem associated with one method of making a panel of sandwich-type composite structure is that during the cold-pressing in a compression mold one or both of the skins does not fully contact or achieve abutting engagement with its respective mold half or die during the molding process. Consequently, the resulting compression-molded, composite component fails to achieve the desired component shape, as defined by the opposing surfaces of upper and lower dies.

The following U.S. patent documents are related to at least one embodiment of the present invention: U.S. Pat. Nos. 5,324,384; 5,352,397; 5,370,521; 5,502,930; 5,506,029; 5,718,791; 5,746,870; 5,915,445; 6,050,630; 6,102,464; 6,435,577; 6,537,413; 6,655,299; 6,682,675; 6,682,676; 6,695,998; 6,748,876; 6,790,026; 6,823,803; 6,843,525; 6,890,023; 6,981,863; 7,090,274; 7,419,713; 7,909,379; 7,919,031; 8,117,972; 2003/0194542; 2005/0189674; 2006/0255611; 2008/0185866; 2011/0281076; 2011/0315310; 2013/0260112; and 2013/0273191.

SUMMARY OF EXAMPLE EMBODIMENTS

An object of at least one embodiment of the present invention is to provide a simplified method of making a laminated trim component at a pair of spaced first and second molding stations which method saves cycle time and labor costs.

In carrying out the above object and other objects of at least one embodiment of the present invention, a method of making a laminated trim component at a pair of spaced first and second molding stations is provided. The method includes providing a natural fiber, plastic composite sheet having inner and outer surfaces and heating the composite sheet to a first softening temperature. The composite sheet is stretchable when heated to the first softening temperature. A laminated sheet overlying the outer surface of the composite sheet is provided. The laminated sheet has a support layer with inner and outer surfaces and a plastic cushioning layer laminated to the support layer at the inner surface of the support layer. The laminated sheet is heated to a second softening temperature. The laminated sheet is stretchable when heated to the second softening temperature. The composite sheet is pressed against the laminated sheet after the steps of providing and the steps of heating to bond the plastic cushioning layer to the plastic composite sheet at the first molding station. The step of pressing compresses a portion of the laminated sheet spaced inwardly from an outer periphery of the laminated sheet to locally compact and thin the cushioning layer at the portion to form a compressed portion of the cushioning layer. Interior portions of the sheets stretch during the step of pressing while remaining intact. The bonded sheets are transferred to the second molding station where a plastic compatible with the plastic of the composite sheet is molded around the composite sheet to form at least one component at the inner surface of the composite sheet.

The method may further include applying a vacuum at the outer surface of the support layer to pull the outer surface of the support layer into contact with a forming surface while the support layer is still soft to improve appearance of the outer surface and improve component shape.

The cushioning support layer may be a thermoplastic foam layer compatible with the plastic of the composite sheet.

The laminated plastic sheet may be a polymer bi-laminate sheet.

The support layer may be a thermoplastic outer skin layer.

The thermoplastic outer skin layer may be a TPO outer skin layer.

The composite sheet may include a thermoplastic resin.

The thermoplastic resin of the composite sheet may be polypropylene.

A plurality of plastic edge components may be formed about a periphery of the composite sheet during the step of molding wherein the method may further include folding the laminated sheet at the compressed portion of the cushioning layer and bonding outer peripheral portions of the folded laminated sheet to the plastic edge components.

Further in carrying out the above object and other objects of at least one embodiment of the invention, a method of making a laminated, vehicle trim component at a pair of spaced first and second molding stations is provided. The method includes providing a natural fiber, plastic composite sheet having inner and outer surfaces and heating the composite sheet to a first softening temperature. The composite sheet is stretchable when heated to the first softening temperature. A laminated sheet overlying the outer surface of the composite sheet is provided. The laminated sheet has a support layer with inner and outer surfaces and a plastic cushioning layer laminated to the support layer at the inner surface of the support layer. The laminated sheet is heated to a second softening temperature. The laminated sheet is stretchable when heated to the second softening temperature. The composite sheet is pressed against the laminated sheet after the steps of providing and the steps of heating to bond the plastic cushioning layer to the plastic composite sheet. The step of pressing compresses a portion of the laminated sheet spaced inwardly from an outer periphery of the laminated sheet to locally compact and thin the cushioning layer at the portion to form a compressed portion of the cushioning layer. Interior portions of the sheets stretch during the step of pressing while remaining intact. The bonded sheets are transferred to the second molding station where a plastic compatible with the plastic of the composite sheet is molded around the composite sheet to form at least one component at the inner surface of the composite sheet.

The method may further include applying a vacuum at the outer surface of the support layer to pull the outer surface of the support layer into contact with a forming surface while the support layer is still soft to improve appearance of the outer surface and improve component shape.

The cushioning support layer may be a thermoplastic foam layer compatible with the plastic of the composite sheet.

The laminated plastic sheet may be a polymer bi-laminate sheet.

The support layer may be a thermoplastic outer skin layer.

The thermoplastic outer skin layer may be a TPO outer skin layer.

The composite sheet may include a thermoplastic resin.

The thermoplastic resin of the composite sheet may be polypropylene.

A plurality of plastic edge components may be formed about a periphery of the composite sheet during the step of molding wherein the method further includes folding the laminated sheet at the compressed portion of the cushioning layer and bonding outer peripheral portions of the folded laminated sheet to the plastic edge components.

Still further in carrying out the above object and other objects of at least one embodiment of the invention, a method of making a laminated, vehicle interior trim component at a pair of spaced first and second molding stations is provided. The method includes providing a natural fiber, plastic composite sheet having inner and outer surfaces and heating the composite sheet to a first softening temperature. The composite sheet is stretchable when heated to the first softening temperature. A laminated sheet overlying the outer surface of the composite sheet is provided. The laminated sheet has a support layer with inner and outer surfaces and a plastic cushioning layer laminated to the support layer at the inner surface of the support layer. The laminated sheet is heated to a second softening temperature. The laminated sheet is stretchable when heated to the second softening temperature. The composite sheet is pressed against the laminated sheet after the steps of providing and the steps of heating to bond the plastic cushioning layer to the plastic composite sheet. The step of pressing compresses a portion of the laminated sheet spaced inwardly from an outer periphery of the laminated sheet to locally compact and thin the cushioning layer at the portion to form a compressed portion of the cushioning layer. Interior portions of the sheets stretch during the step of pressing while remaining intact. The bonded sheets are transferred to the second molding station where a plastic compatible with the plastic of the composite sheet is molded around the composite sheet to form at least one component at the inner surface of the composite sheet at the second molding station.

The method may further include applying a vacuum at the outer surface of the support layer to pull the outer surface of the support layer into contact with a forming surface while the support layer is still soft to improve appearance of the outer surface and improve component shape.

The cushioning support layer may be a thermoplastic foam layer compatible with the plastic of the composite sheet.

The laminated plastic sheet may be a polymer bi-laminate sheet.

The outer skin layer may be a thermoplastic outer skin layer.

The thermoplastic outer skin layer may be a TPO outer skin layer.

The composite sheet may include a thermoplastic resin.

The thermoplastic resin of the composite sheet may be polypropylene.

A plurality of plastic edge components may be formed about a periphery of the composite sheet during the step of molding. The method may further include folding the laminated sheet at the compressed portion of the cushioning layer and bonding outer peripheral portions of the folded laminated sheet to the plastic edge components.

Other technical advantages will be readily apparent to one skilled in the art from the following figures, descriptions and claims. Moreover, while specific advantages have been enumerated, various embodiments may include all, some, or none of the enumerated drawings.

BRIEF DESCRIPTION OF THE DRAWINGS

FIG. 5D is a view of the mold of FIGS. 5A-5C with the trimming parts moved to their extended positions by an actuator under control of a controller;

FIG. 6A is an enlarged view, partially broken away and in cross section, of a compressed outer peripheral portion of the door panel enclosed by the circle of FIG. 4C with mold half portions and a cutting tool in the lower mold half;

FIG. 6B is a view similar to the view of FIG. 6A but showing a different compressed outer peripheral portion of the door panel with mold half portions;

FIG. 6C is a view similar to the views of FIGS. 6A and 6B but showing yet another different compressed outer peripheral portion of the door panel with mold half portions and a cutting tool in the lower mold half;

FIG. 7 is a schematic perspective view, partially broken away and in cross section, of an outer peripheral portion of the door panel with the compressed composite sheet folded over and bonded to the "B" surface of the panel; and FIG. 8 is a view similar to the view of FIG. 7 with an outer peripheral portion of a cushioning layer of the laminated sheet removed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
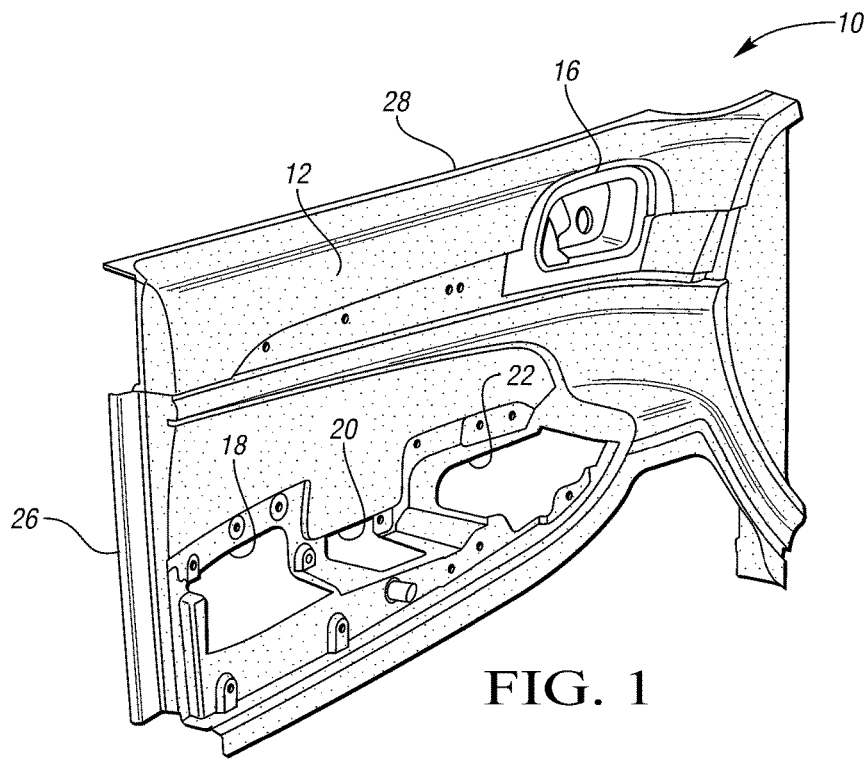
FIG. 1 is a schematic perspective view of an "A" side of a vacuum-injection-compression (VIC) molded upper interior vehicle door panel without its laminated outer facing material.
Figure 2:
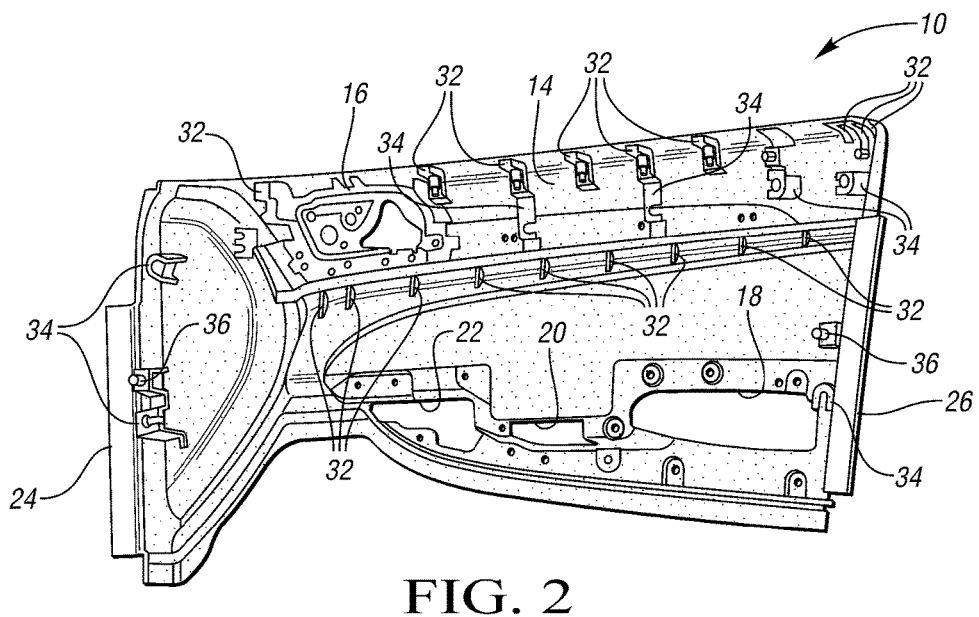
FIG. 2 is a schematic perspective view of a "B" side of the panel of FIG. 1 and illustrating a plurality of injection molded plastic components thereon.
Figure 3:
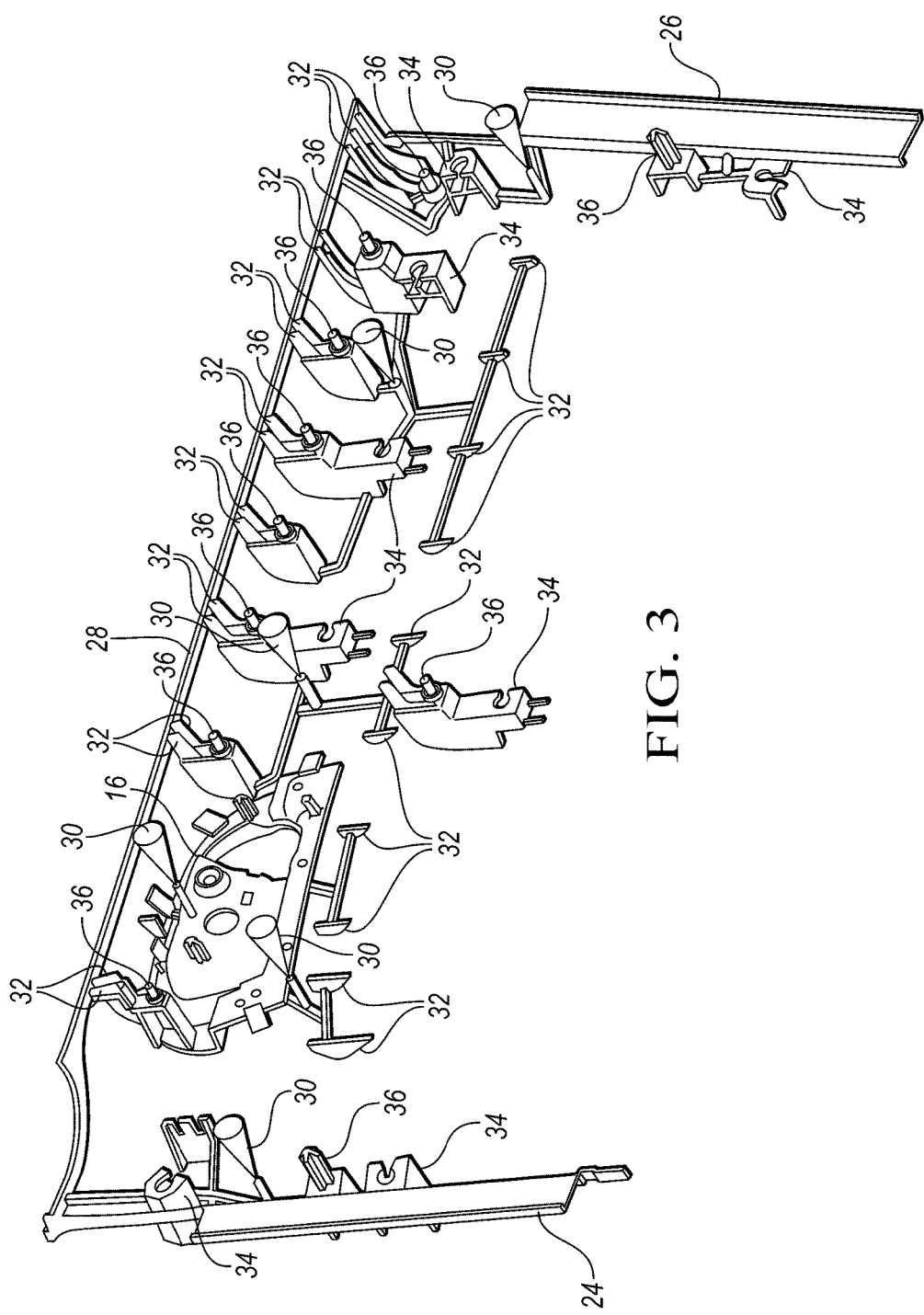
FIG. 3 is a schematic perspective view of the components of FIG. 2 and molded flow "runners" including "drops" separate from the panel of FIGS. 1 and 2.

At least one embodiment of the present invention provides a method of making a laminated trim component, such as vehicle trim component or upper interior door panel, generally indicated at 10 in FIGS. 1 and 2. The panel 10 has an inner "A" surface 12 and an outer "B" surface 14. The panel 10 includes a number of apertures 16, 18, 20 and 22 which receive and retain a number of different automotive components. The panel 10 includes a plurality of edge components 24, 26 and 28 which are made from plastic resin which initially flows from "drops" 30 (FIG. 3) to stiffening ribs 32, receptacles 34 and posts 36 to provide attachment locations for various automotive components including wiring harnesses, etc. on the "B" surface 14 of the panel 10.

Referring now to FIGS. 4A-4D, the method includes providing a natural fiber, plastic composite sheet or substrate, generally indicated at 40, having inner and outer surfaces 42 and 44, respectively. Substrates of fibrous molding material have a few advantages over plastics. For example, a considerable portion of fibrous molding materials is produced of renewable resources such as conifers, hemp or kenaf. Technical and economical considerations also fuel the trend toward fibrous molding materials. At the same specific rigidity, fibrous molding materials have a lower weight than glass fiber-polypropylene composites or talcum-polypropylene composites. Substrates of fibrous molding materials are distinguished by their favorable crash and splintering characteristics, their sound energy and acoustic absorption (also at cold temperatures) and a comparatively low coefficient of thermal expansion. The industry has many years of experience with the processing of fibrous molding materials, wherein the corresponding processes and hot-pressing molds are respectively robust and cost-efficient in comparison with injection molds. Fibrous molding materials allow the manufacture of substrates with highly pronounced undercuts and changes in direction with an angle of up to 180 degrees. Furthermore, wood fibers and natural fibers are available in large quantities, wherein their price is also less dependent on the price of crude oil than petroleum-based plastics.

The composite sheet 40 is heated in an oven (not shown) while on a conveyor 46 to a first softening temperature. The composite sheet 40 is stretchable when heated to the first softening temperature. The heated composite sheet 40 is transferred or conveyed by a conveyor 46 to a position between mold halves 52 and 54 of a compression mold, generally indicated at 56. The heated composite sheet 40 may then be molded into the shape defined by the mold halves 52 and 54 at that time or can be molded together with a laminated sheet, generally indicated at 50 in FIG. 4A. The lower mold 54 may have raised portions 55 to help form the panel 10.

The laminated sheet 50 overlies the outer surface 44 of the composite sheet 40 after the sheet 40 is in its molded or unmolded condition. Like the sheet 40, the sheet 50 is transported between the mold halves 52 and 54 of the compression mold 56 by a conveyor 58. Because the sheet 50 is flexible, the sheet 50 is supported by a frame 60. The laminated sheet 50 has a support layer 62 with inner and outer surfaces and a plastic cushioning or foam layer 68 laminated to the support layer 62 at the inner surface 66 of the support layer 62.

The foam layer 68 may be cross-linked polypropylene (XLPP) foam and the support or outer skin layer 62 may be suitable thermoplastic materials including but are not limited to polyethylene-based polyolefin elastomer or polypropylene-based thermoplastic elastomer, poly-urethane resins and other co-polymers and equivalents thereof. Non-limiting examples include; thermoplastic elastic olefin (TEO), thermoplastic elastomer (TPE), thermoplastic elastomer-oefinic (TPE-O, TPO), thermoplastic elastomer-styrenic (TPE-S), Polycarbonate (PC), Polycarbonate/Acrylonitrile-Butadiene-Styrene (PC/ABS), Acrylonitrile-Butadiene-Styrene (ABS) copolymers, Poly-urethane (TPU) and Polyvinyl-Chloride (PVC). The outer skin layer may also be vinyl or leather.

The laminated sheet 50 is heated to a second softening temperature in an oven (not shown) while being supported by the frame 60. The laminated sheet 50 is stretchable when heated to the second softening temperature.

Figure 4A:
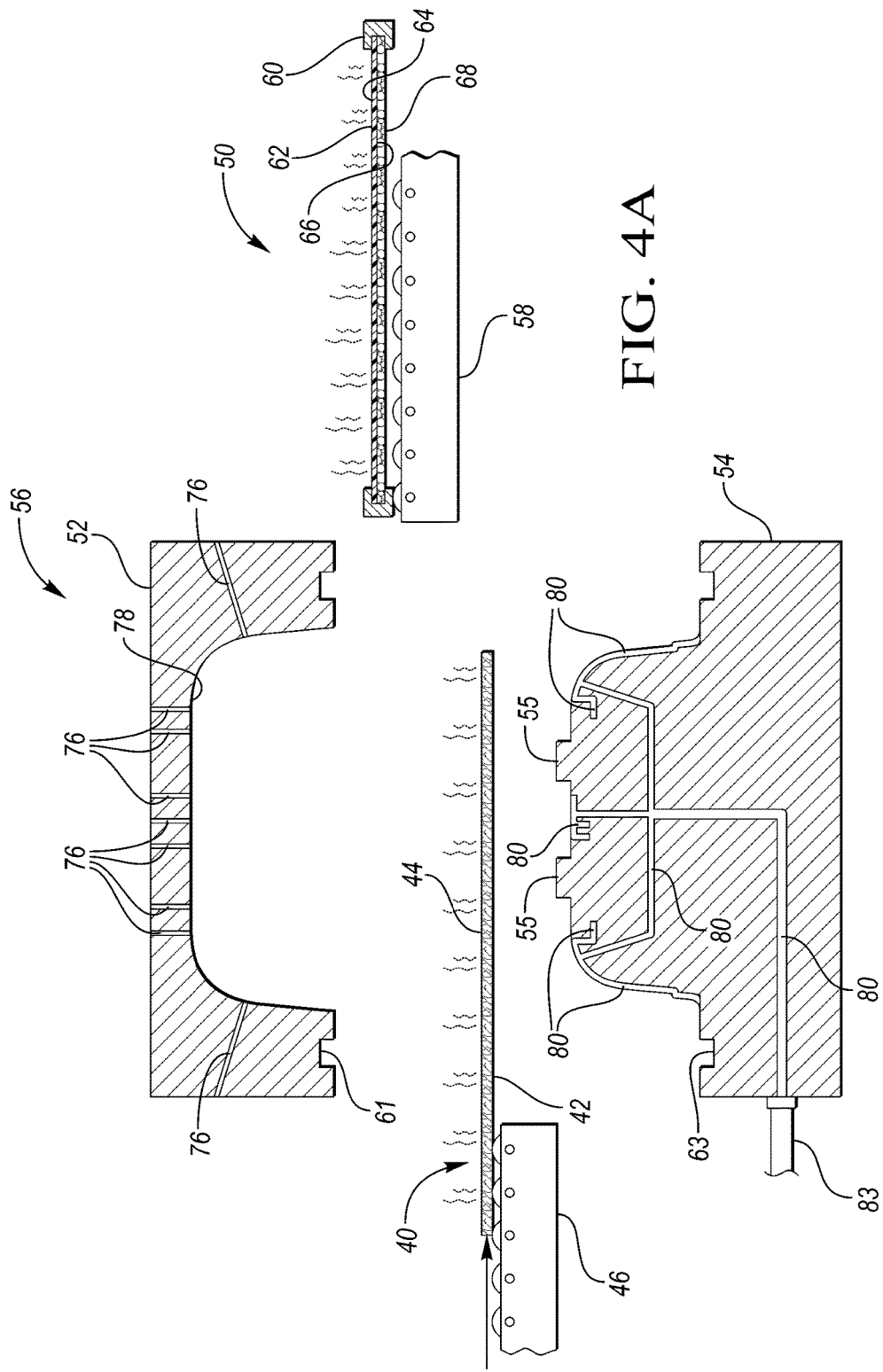
FIG. 4A is a side view, partially broken away and in cross section, showing an open compression mold and conveyors for conveying heated sheets of composite and laminated sheets between the mold halves of the mold at a first mold station to make the panel of FIGS. 1 and 2 together with the laminated outer facing material.
Figure 4B:
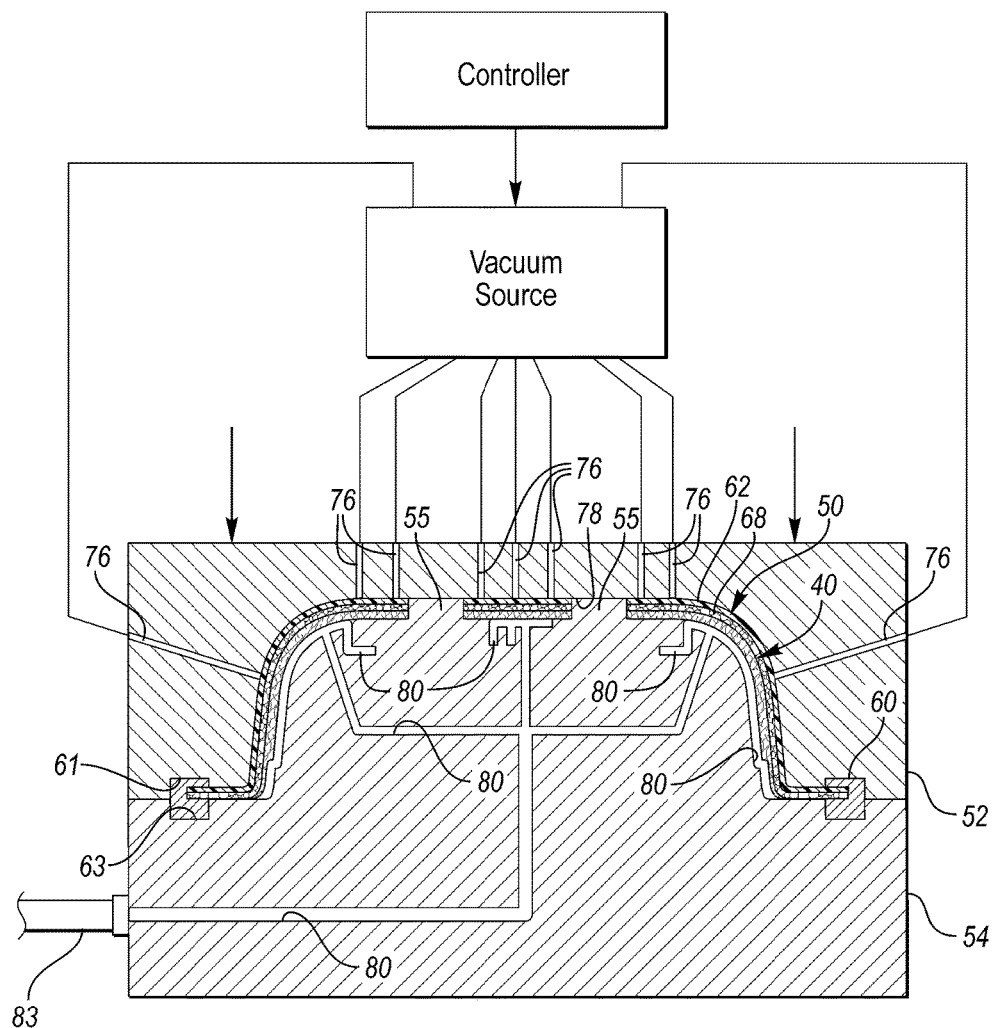
FIG. 4B is a view similar to the view of FIG. 4A but with the mold in its closed position and further illustrating a vacuum source under control of a controller for applying a vacuum to the laminated sheet.
Figure 4C:
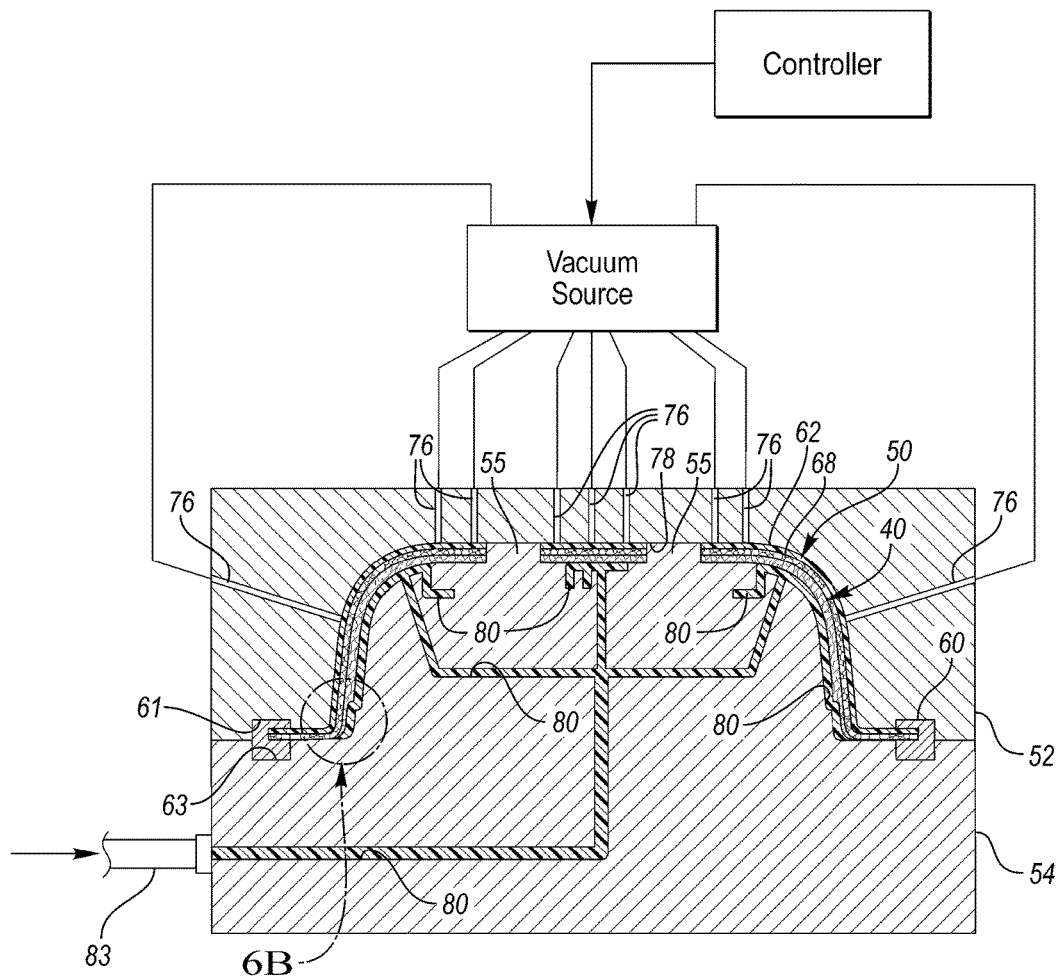
FIG. 4C is a view similar to the view of FIG. 4B but further showing the injection of molten resin in the lower mold half to form the plastic components and runners on the "B" surface.

Referring specifically to FIG. 4B, the composite sheet 40 is pressed against the laminated sheet 50 after the steps of providing and the steps of heating to bond the plastic cushioning layer 68 to the plastic composite sheet 40. The plastics of the layer 68 and the sheet 40 are compatible to permit such bonding. As shown in FIGS. 6a-6C, the step of pressing compresses a portion 70 of the laminated sheet 50 spaced inwardly from an outer periphery 72 of the laminated sheet 50 to locally compact and thin the cushioning layer 68 at the portion 70 to form a compressed portion 74 (FIG. 7) of the cushioning layer 68 between uncompressed portions of the cushioning layer 68. Interior portions of the sheets 40 and 50 stretch during the step of pressing while remaining intact. During the pressing step the frame 60 is secured within slots 61 and 63 machined in the upper and lower mold halves 52 and 54, respectively.

Referring again to FIGS. 4A-4D, the method further includes applying a vacuum at the outer surface 64 of the support layer 62 to pull the outer surface 64 of the support layer 62 into contact with a forming surface 78 of the upper mold half 52 while the support layer 62 is still soft to improve appearance of the outer surface 64 and improve component shape. The vacuum is provided by a vacuum source (FIGS. 4B and 4C) operating through passages 76 and under control of a vacuum controller.

The cushioning support layer 62 preferably is a thermoplastic foam layer compatible with the plastic of the composite sheet 40.

The laminated plastic sheet 50 is preferably a polymer bi-laminate sheet.

The support layer 62 is preferably a thermoplastic outer skin layer 62. The thermoplastic outer skin layer 62 is preferably a TPO outer skin layer.

The composite sheet 40 typically includes a thermoplastic resin. The thermoplastic resin of the composite sheet 40 is preferably polypropylene.

The method may further include folding the laminated sheet 50 at the compressed portion 74 of the cushioning layer 68 and bonding outer peripheral uncompressed portions of the folded laminated sheet 50 to the inner surface 42 of the composite sheet 40 as shown in FIG. 7. Alternatively, outer peripheral portions of the cushioning layer 68 are removed by trimming or cutting blades 81 as shown in FIGS. 6A and 6C supported in the lower mold half 54 and actuated by a blade actuator. The resulting trimmed laminated sheet 50 is then folded over the composite sheet 40 as shown in FIG. 8 wherein the support layer 62 is bound to the inner surface 42 of the composite sheet 40. The trimming and folding may occur in the mold 56 as is well known in the art or may take place outside of the mold 56 as shown in FIG. 4D.

As shown in FIGS. 4A-4D, the lower mold half 54 may include passages 80 for molding a plastic injected by a nozzle 83 into the lower mold half 54. The plastic is compatible with the plastic of the composite sheet 40 to bond the plastics together and is molded around the composite sheet 40 to form at least one component such as the components 24, 26, 28, 32, 34 and 36 at the inner surface 42 of the composite sheet 40 at the first molding station.

Figure 4D:
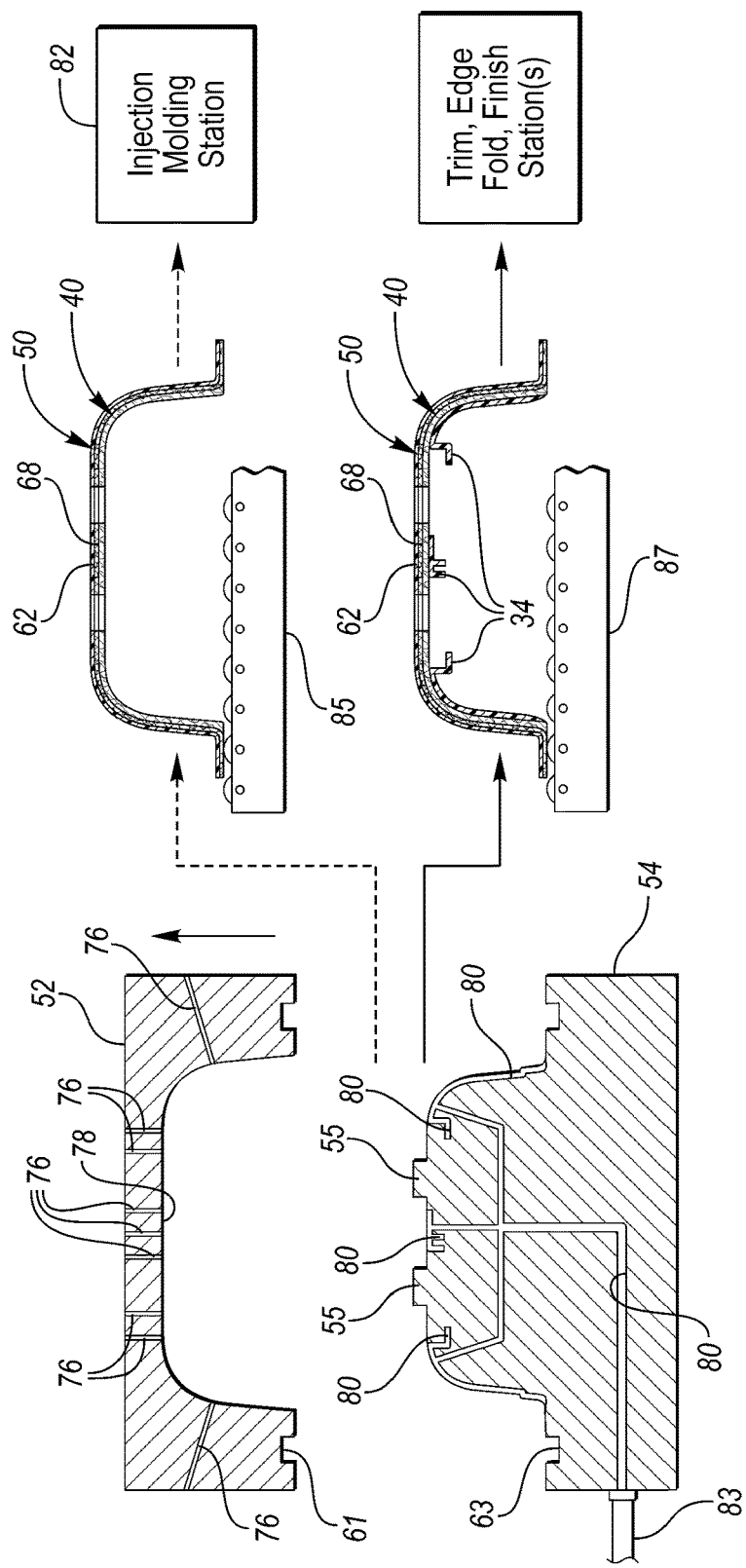
FIG. 4D is a view similar to the view of FIGS. 4A-4C wherein in the upper right portion thereof the molded component does not have components bonded thereto at the first molding station on the left but rather has the injection molded components bonded thereto at a second molding station after conveyance thereto by a conveyor; alternatively, in the lower right portion of FIG. 4D the component with the bonded injection molded components from the first molding station is transferred to one or more trim, edge, fold and finish stations by a conveyor to complete the manufacturing process.

The bonded sheets 40 and 50 may be transferred by a conveyor 85 without injection molding at the first molding station to a second molding station 82 as shown in the upper right-hand portion of FIG. 4D. The bonded sheets 40 and 50, alternatively, may be transferred by a conveyor 87 to one or more trim, edge fold, finish stations after injection molding of the plastic components 24, 26, 28, 32, 34 and 36 as shown in the lower right portion of FIG. 4D.

At the second molding station 82, a plastic compatible with the plastic of the composite sheet 40 is molded around the composite sheet 40 to form at least one component such as the components 24, 26, 28, 32, 34 and 36 at the inner surface 42 of the composite sheet 40.

The plurality of plastic edge components 24, 26 and 28 may be formed about the periphery 72 of the composite sheet 40 during the step of injection molding. The method may further include folding the laminated sheet 50 at the compressed portion 70 of the cushioning layer 68 and bonding outer peripheral uncompressed portions of the folded laminated sheet 50 to the plastic edge components 24, 26 and 28.

Figure 5A:
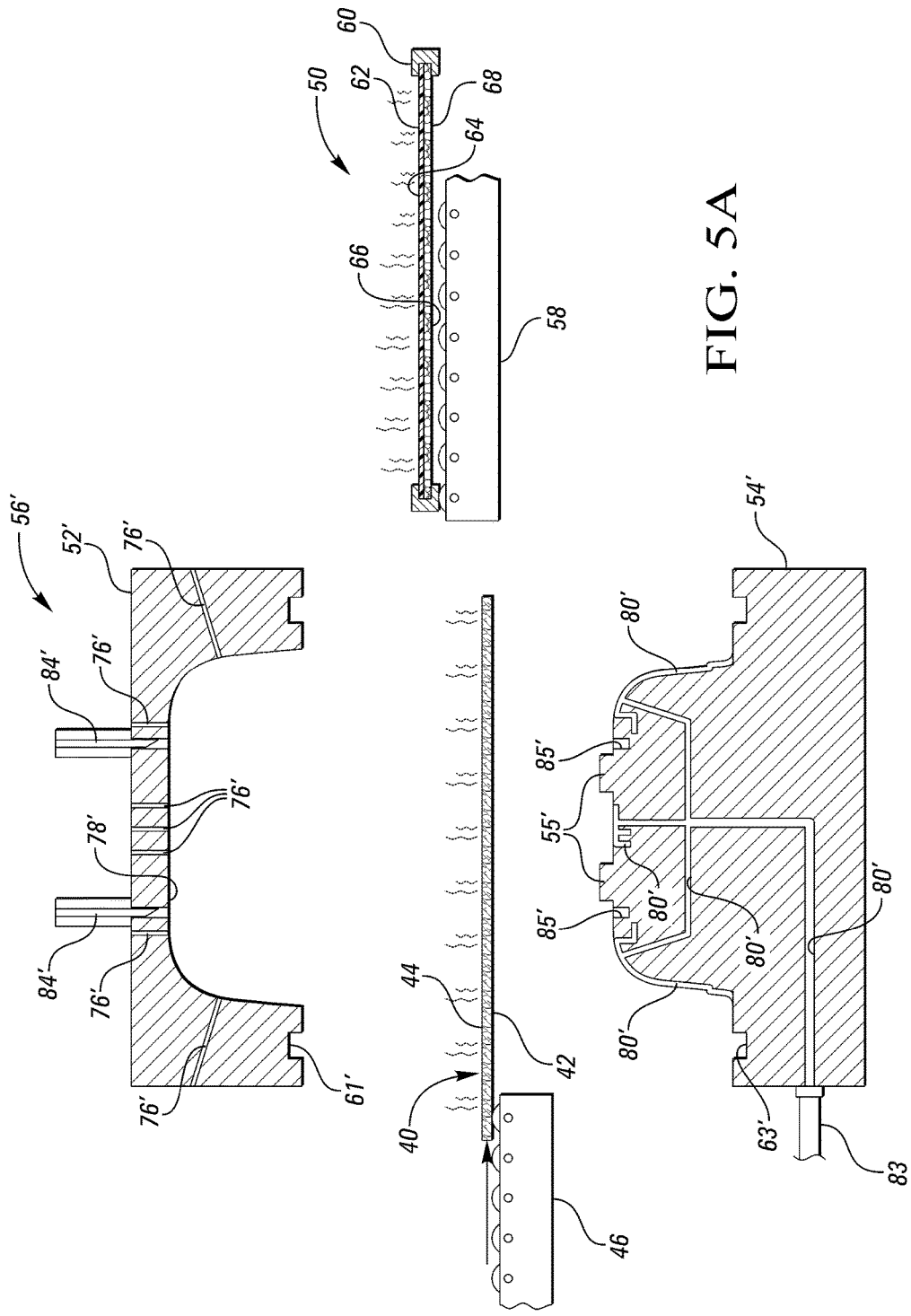
FIG. 5A is a view similar to the view of FIG. 4A but the upper mold half also supports trimming parts in the form of blades to trim the component to form the vehicle door panel.
Figure 5B:
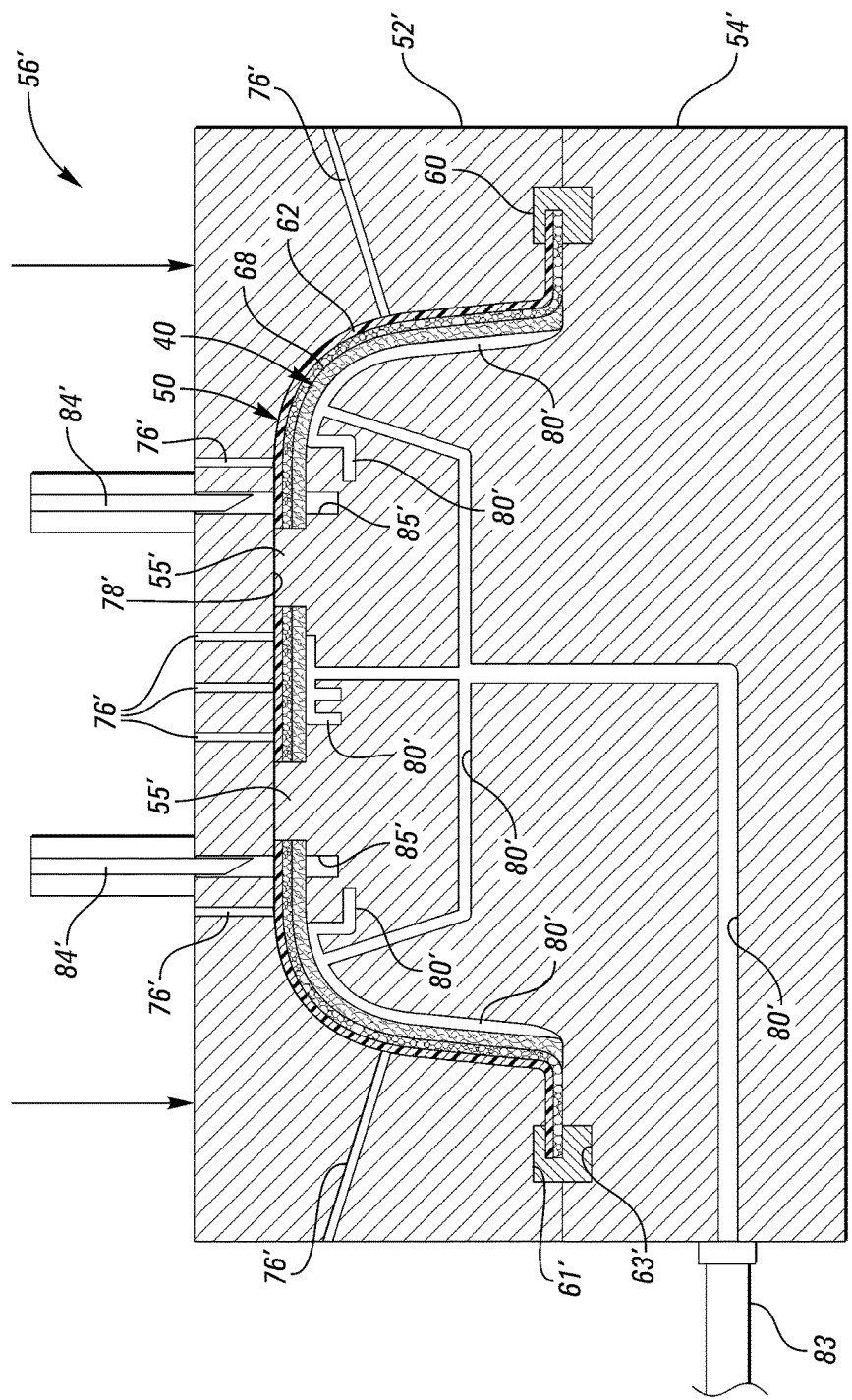
FIG. 5B is a view similar to the view of FIG. 4B wherein the mold of FIG. 5A is in its closed position.
Figure 5C:
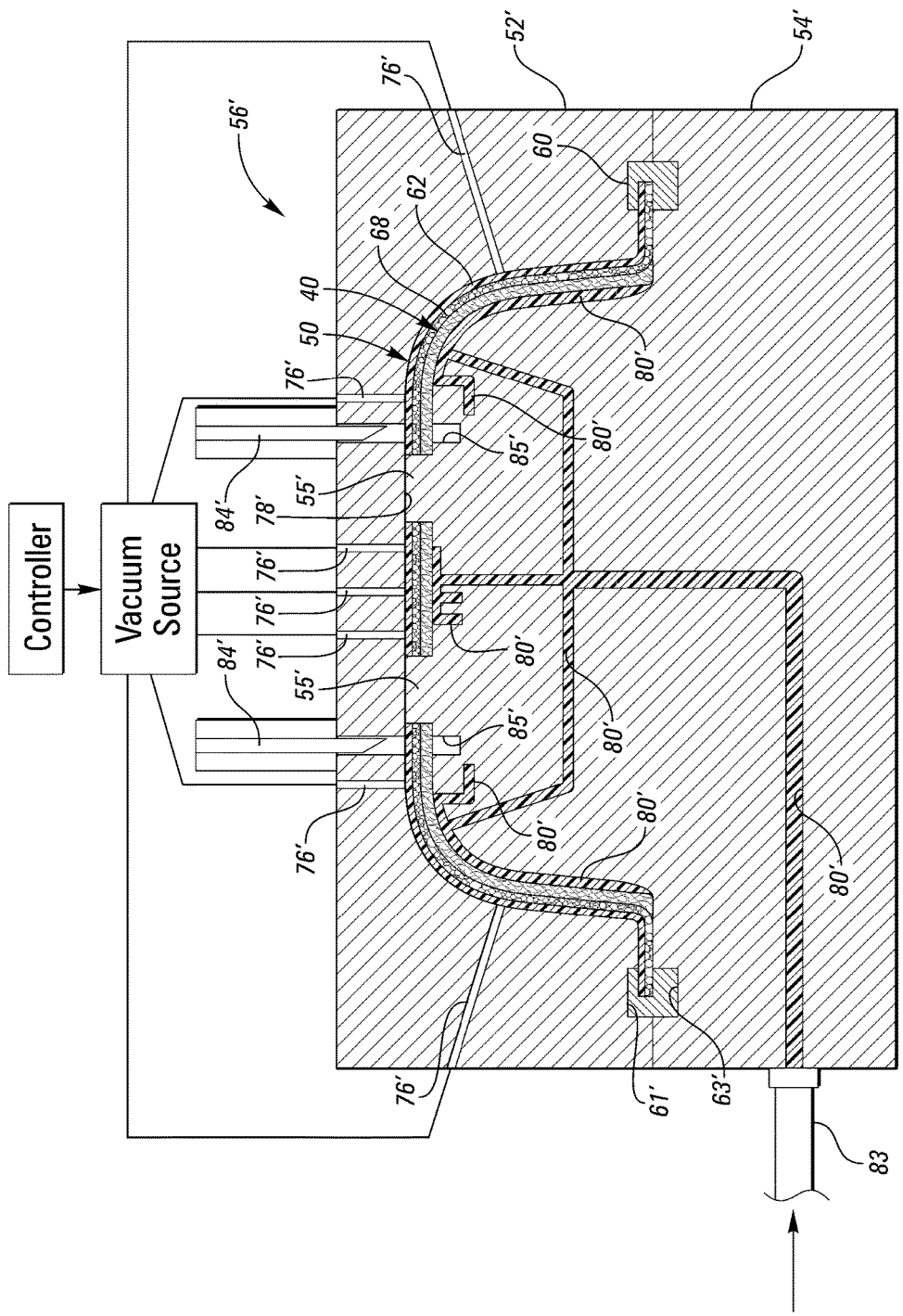
FIG. 5C is a view similar to the view of FIG. 4C wherein the mold of FIGS. 5A and 5B has molten resin injected into its lower mold half.
Figure 5E:
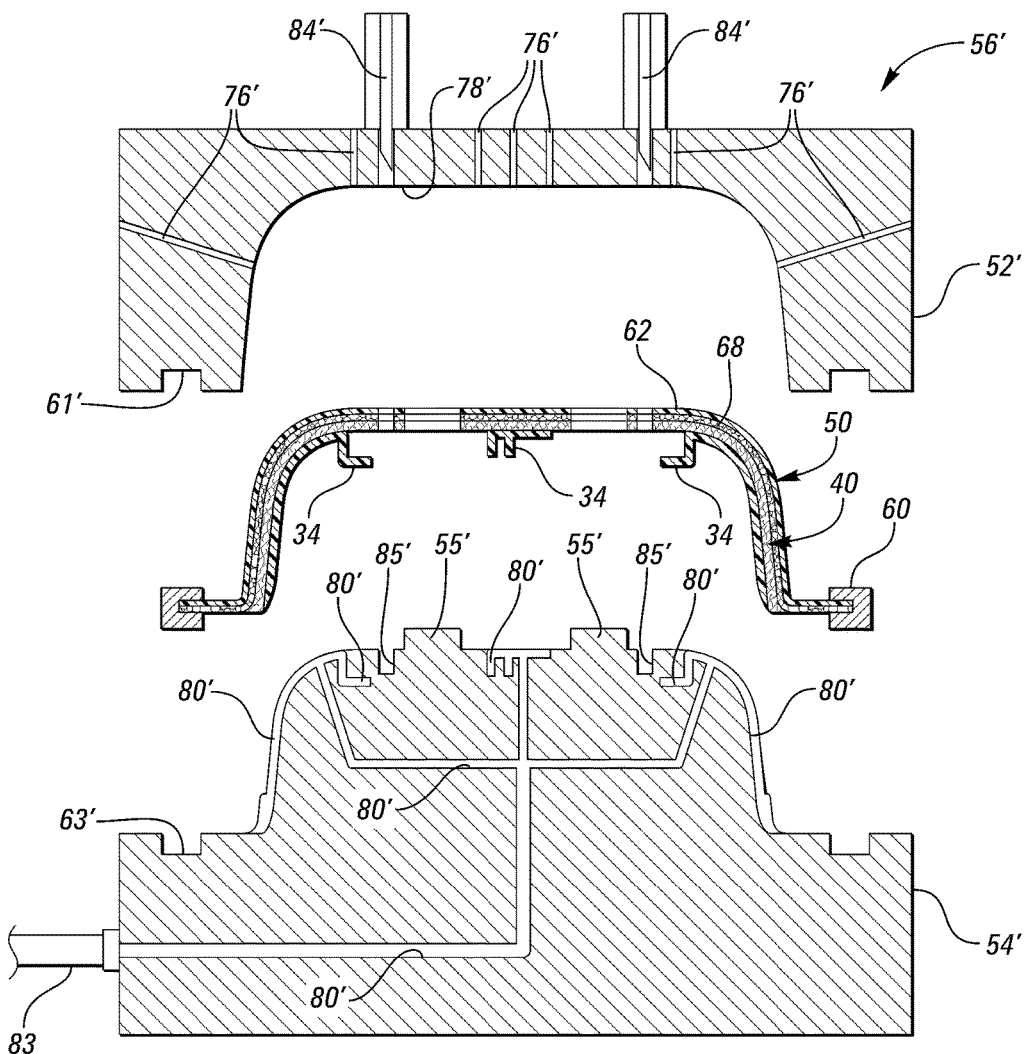
FIG. 5E is a view of the mold of FIGS. 5C-5D in its open position with a trimmed, molded part between the mold halves.

The method also typically includes trimming unwanted portions of the laminated sheet as shown in FIGS. 5A-5G. Trimming may be accomplished by cutting blades 84' mounted for translational movement in an upper mold half 52' of a mold 56'. The blades 84' are moved by an actuator 86' under control of a controller 88' as shown in FIGS. 5C and 5D. Apertures 85' are formed in the lower mold half 54' to receive the extended blades 84'. The mold 56' has a single prime designation to distinguish the mold 56' from the mold 56. However, the parts of the mold 56' have the same reference number as the parts of the mold 56 to indicate the same or similar structure and/or function.

Figure 5F:
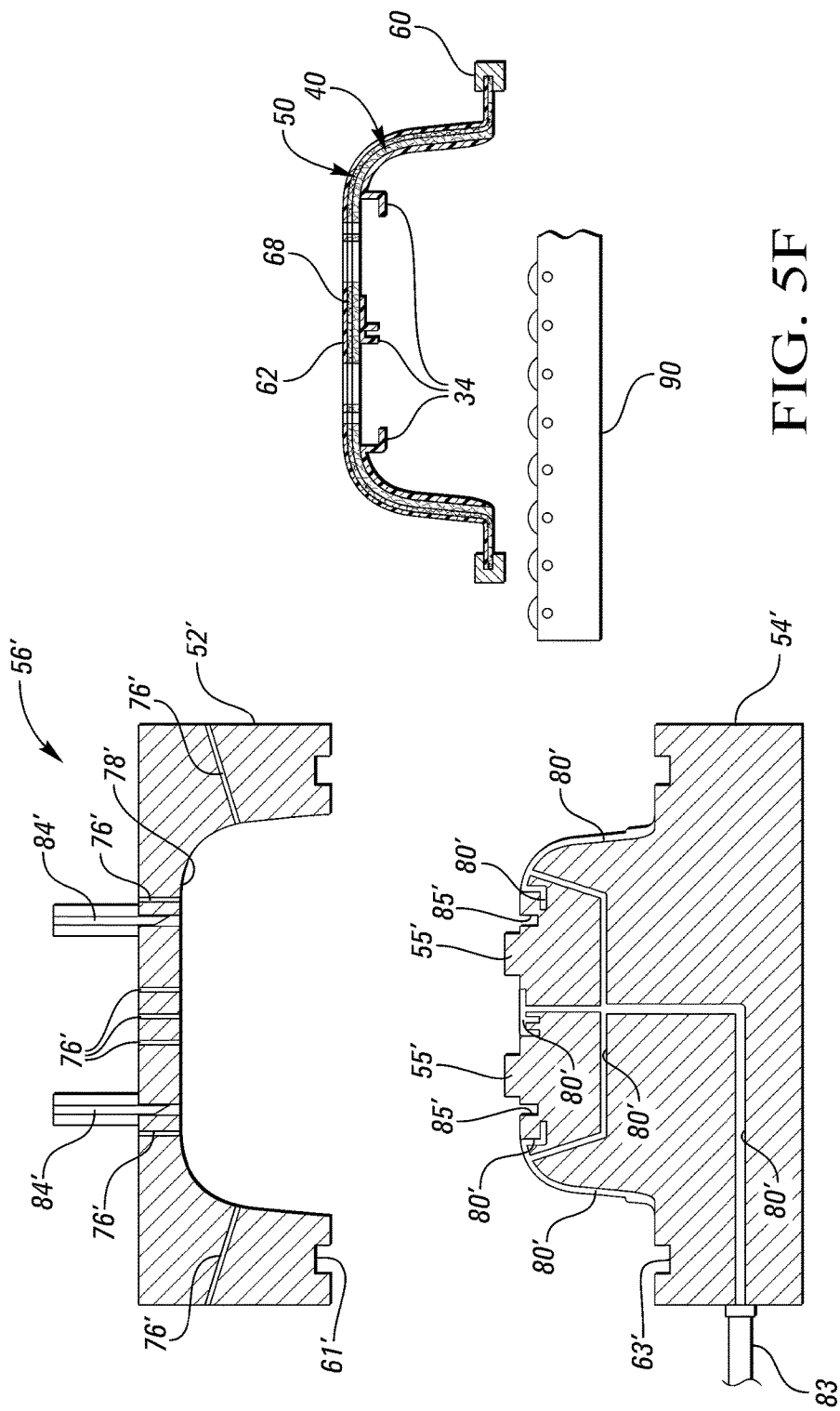
FIG. 5F is a view of the mold of FIGS. 5A-5E with the trimmed, molded part of FIG. 5E transferred out of the first mold station by a conveyor.
Figure 5G:
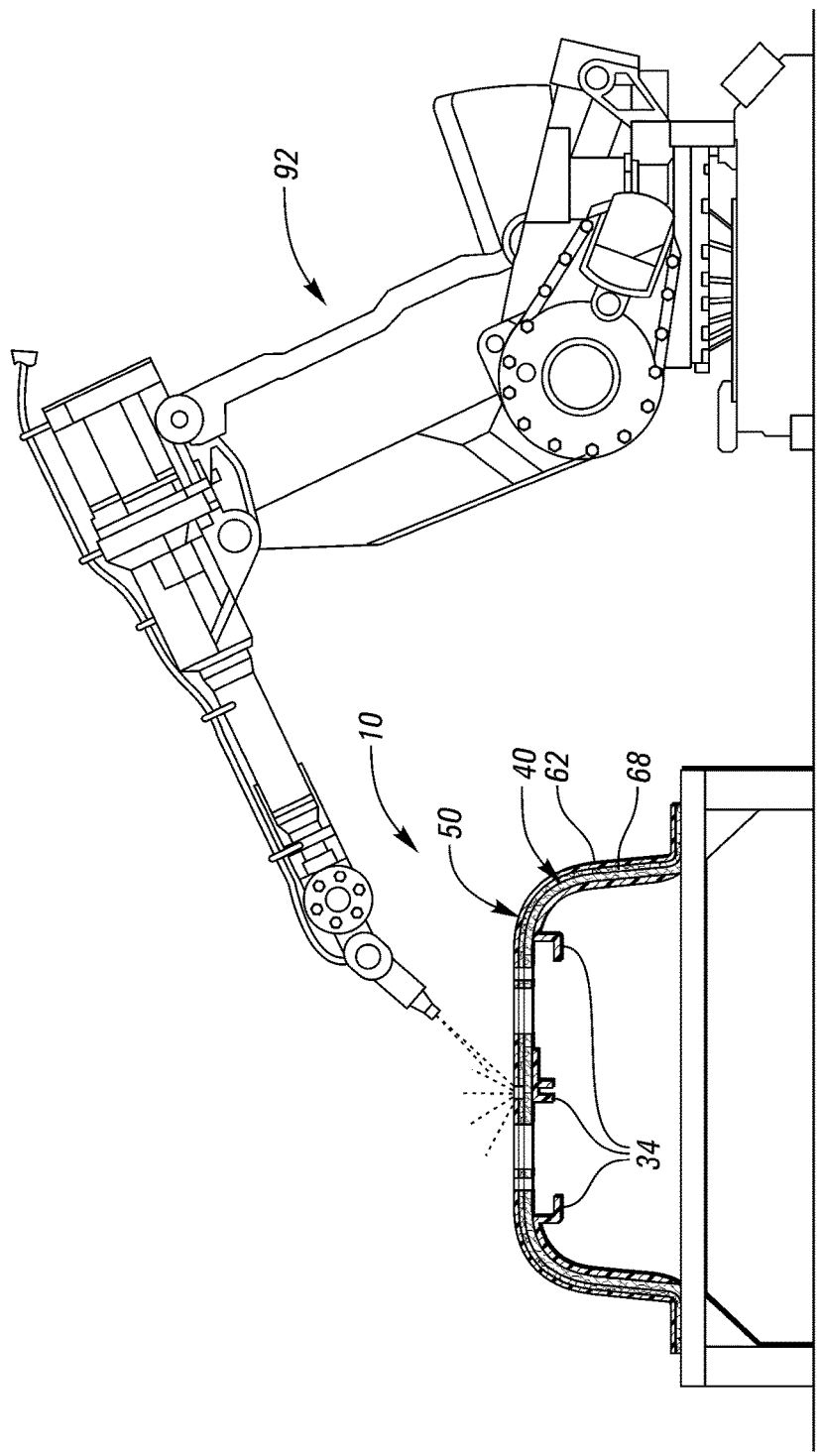
FIG. 5G is a view of the trimmed, molded part of FIG. 5F being further trimmed at a trimming station by an industrial robot with pressurized fluid.

In FIG. 5F the trimmed panel 10 may be transferred or conveyed by a conveyor 90 to another trimming station as shown in FIG. 5G for further trimming by an industrial robot 92. As shown in FIG. 5G, the panel 10 is trimmed by high pressure water or other fluid as directed by the robot 92. Alternatively, the mold 56' is not provided with the cutting blades 84' and all or substantially all of the trimming is performed by the robot 92 or manually.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a laminated trim component at a pair of spaced first and second molding stations, the method comprising:
    providing a natural fiber, plastic composite sheet having inner and outer surfaces;
    heating the composite sheet to a first softening temperature, wherein the composite sheet is stretchable when heated to the first softening temperature;
    providing a laminated sheet overlying the outer surface of the composite sheet, the laminated sheet having a support layer with inner and outer surfaces and a plastic cushioning layer laminated to the support layer at the inner surface of the support layer;
    heating the laminated sheet to a second softening temperature, wherein the laminated sheet is stretchable when heated to the second softening temperature;
    pressing the composite sheet against the laminated sheet after the steps of providing and the steps of heating to bond the plastic cushioning layer to the plastic composite sheet at the first molding station, wherein the step of pressing compresses a portion of the laminated sheet spaced inwardly from an outer periphery of the laminated sheet to locally compact and thin the cushioning layer at the portion to form a compressed portion of the cushioning layer, and wherein interior portions of the sheets stretch during the step of pressing while remaining intact;
    transferring the bonded sheets to the second molding station; and
    molding a plastic compatible with the plastic of the composite sheet around the composite sheet to form at least one component at the inner surface of the composite sheet at the second molding station wherein a plurality of plastic edge components are formed about a periphery of the composite sheet during the step of molding and wherein the method further comprises folding the laminated sheet at the compressed portion of the cushioning layer and bonding outer peripheral portions of the folded laminated sheet to the plastic edge components.

2. The method as claimed in claim 1, further comprising applying a vacuum at the outer surface of the support layer to pull the outer surface of the support layer into contact with a forming surface while the support layer is still soft to improve appearance of the outer surface and improve component shape.

3. The method as claimed in claim 1, wherein the plastic cushioning layer is a thermoplastic foam layer compatible with the plastic of the composite sheet.

4. The method as claimed in claim 1, wherein the laminated plastic sheet is a polymer bi-laminate sheet.

5. The method as claimed in claim 1, wherein the support layer is a thermoplastic outer skin layer.

6. The method as claimed in claim 5, wherein the thermoplastic outer skin layer is a TPO outer skin layer.

7. The method as claimed in claim 1, wherein the composite sheet includes a thermoplastic resin.

8. The method as claimed in claim 7, wherein the thermoplastic resin of the composite sheet is polypropylene.

9. A method of making a laminated, vehicle trim component at a pair of spaced first and second molding stations, the method comprising:
    providing a natural fiber, plastic composite sheet having inner and outer surfaces;
    heating the composite sheet to a first softening temperature, wherein the composite sheet is stretchable when heated to the first softening temperature;
    providing a laminated sheet overlying the outer surface of the composite sheet, the laminated sheet having a support layer with inner and outer surfaces and a plastic cushioning layer laminated to the support layer at the inner surface of the support layer;
    heating the laminated sheet to a second softening temperature, wherein the laminated sheet is stretchable when heated to the second softening temperature;
    pressing the composite sheet against the laminated sheet after the steps of providing and the steps of heating to bond the plastic cushioning layer to the plastic composite sheet, wherein the step of pressing compresses a portion of the laminated sheet spaced inwardly from an outer periphery of the laminated sheet to locally compact and thin the cushioning layer at the portion to form a compressed portion of the cushioning layer and wherein interior portions of the sheets stretch during the step of pressing while remaining intact;
    transferring the bonded sheets to the second molding station; and
    molding a plastic compatible with the plastic of the composite sheet around the composite sheet to form at least one component at the inner surface of the composite sheet at the second molding station wherein a plurality of plastic edge components are formed about a periphery of the composite sheet during the step of molding and wherein the method further comprises folding the laminated sheet at the compressed portion of the cushioning layer and bonding outer peripheral portions of the folded laminated sheet to the plastic edge components.

10. The method as claimed in claim 9, further comprising applying a vacuum at the outer surface of the support layer to pull the outer surface of the support layer into contact with a forming surface while the support layer is still soft to improve appearance of the outer surface and improve component shape.

11. The method as claimed in claim 9, wherein the plastic cushioning layer is a thermoplastic foam layer compatible with the plastic of the composite sheet.

12. The method as claimed in claim 9, wherein the laminated plastic sheet is a polymer bi-laminate sheet.

13. The method as claimed in claim 9, wherein the support layer is a thermoplastic outer skin layer.

14. The method as claimed in claim 13, wherein the thermoplastic outer skin layer is a TPO outer skin layer.

15. The method as claimed in claim 9, wherein the composite sheet includes a thermoplastic resin.

16. The method as claimed in claim 15, wherein the thermoplastic resin of the composite sheet is polypropylene.

17. A method of making a laminated, vehicle interior trim component at a pair of spaced first and second molding stations, the method comprising:
providing a natural fiber, plastic composite sheet having inner and outer surfaces;
heating the composite sheet to a first softening temperature, wherein the composite sheet is stretchable when heated to the first softening temperature;
providing a laminated sheet overlying the outer surface of the composite sheet, the laminated sheet having a support layer with inner and outer surfaces and a plastic cushioning layer laminated to the support layer at the inner surface of the support layer;
heating the laminated sheet to a second softening temperature, wherein the laminated sheet is stretchable when heated to the second softening temperature;
pressing the composite sheet against the laminated sheet after the steps of providing and the steps of heating to bond the plastic cushioning layer to the plastic composite sheet, wherein the step of pressing compresses a portion of the laminated sheet spaced inwardly from an outer periphery of the laminated sheet to locally compact and thin the cushioning layer at the portion to form a compressed portion of the cushioning layer, and wherein interior portions of the sheets stretch during the step of pressing while remaining intact;
transferring the bonded sheets to the second molding station; and
molding a plastic compatible with the plastic of the composite sheet around the composite sheet to form at least one component at the inner surface of the composite sheet at the second molding station wherein a plurality of plastic edge components are formed about a periphery of the composite sheet during the step of molding and wherein the method further comprises folding the laminated sheet at the compressed portion of the cushioning layer and bonding outer peripheral portions of the folded laminated sheet to the plastic edge components.

18. The method as claimed in claim 17, further comprising applying a vacuum at the outer surface of the support layer to pull the outer surface of the support layer into contact with a forming surface while the support layer is still soft to improve appearance of the outer surface and improve component shape.

19. The method as claimed in claim 17, wherein the plastic cushioning layer is a thermoplastic foam layer compatible with the plastic of the composite sheet.

20. The method as claimed in claim 17, wherein the laminated plastic sheet is a polymer bi-laminate sheet.

21. The method as claimed in claim 17, wherein the outer skin layer is a thermoplastic outer skin layer.

22. The method as claimed in claim 21, wherein the thermoplastic outer skin layer is a TPO outer skin layer.

23. The method as claimed in claim 17, wherein the composite sheet includes a thermoplastic resin.

24. The method as claimed in claim 23, wherein the thermoplastic resin of the composite sheet is polypropylene.

* * * * *